(12) United States Patent
Komori et al.

(10) Patent No.: US 8,852,311 B2
(45) Date of Patent: Oct. 7, 2014

(54) HONEYCOMB STRUCTURE

(75) Inventors: Teruo Komori, Niihama (JP); Hajime Yoshino, Niihama (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 13/522,195

(22) PCT Filed: Jan. 18, 2011

(86) PCT No.: PCT/JP2011/050716
§ 371 (c)(1),
(2), (4) Date: Aug. 31, 2012

(87) PCT Pub. No.: WO2011/090015
PCT Pub. Date: Jul. 28, 2011

(65) Prior Publication Data
US 2012/0317942 A1 Dec. 20, 2012

(30) Foreign Application Priority Data
Jan. 19, 2010 (JP) ................................. 2010-008679

(51) Int. Cl.
*B01D 39/14* (2006.01)
*B01D 39/06* (2006.01)
*B01D 39/20* (2006.01)
*B01D 24/00* (2006.01)
*B01D 50/00* (2006.01)
*B01J 35/04* (2006.01)
*B01D 46/24* (2006.01)
*F01N 3/022* (2006.01)
*F01N 3/28* (2006.01)

(52) U.S. Cl.
CPC ............... *F01N 3/2828* (2013.01); *B01J 35/04* (2013.01); *B01D 46/2455* (2013.01); *F01N 3/0222* (2013.01); *F01N 2330/48* (2013.01); *F01N 2260/10* (2013.01); *Y02T 10/20* (2013.01); *B01D 2279/30* (2013.01); *B01D 2046/2492* (2013.01); *B01D 46/247* (2013.01)
USPC .................. 55/523; 55/522; 55/524; 422/169; 422/170; 422/171; 422/172; 422/177; 422/178; 422/179; 422/180; 422/181; 422/182

(58) Field of Classification Search
CPC . B01J 35/04; B01D 46/2455; B01D 2279/30; B01D 2046/2492; B01D 46/247; F01N 3/0022; F01N 2330/48; F01N 2260/10; Y02T 10/20
USPC ............. 55/522–524; 422/169–172, 177–182
See application file for complete search history.

(56) References Cited

U.S. PATENT DOCUMENTS

| | | | |
|---|---|---|---|
| 3,853,485 A * | 12/1974 | Hogan | 502/300 |
| 4,810,554 A | 3/1989 | Hattori et al. | |
| 5,108,685 A * | 4/1992 | Kragle | 264/177.12 |
| 5,514,446 A | 5/1996 | Machida et al. | |
| 5,916,133 A * | 6/1999 | Buhrmaster et al. | 60/297 |
| 7,429,285 B2 | 9/2008 | Kuki et al. | |
| 7,488,412 B2 | 2/2009 | Abe et al. | |
| 7,824,629 B2 | 11/2010 | Oshimi et al. | |
| 2004/0131512 A1 | 7/2004 | Abe et al. | |
| 2005/0210848 A1 | 9/2005 | Kuki et al. | |
| 2007/0068128 A1 | 3/2007 | Oshimi et al. | |
| 2010/0071346 A1 * | 3/2010 | Klingberg | 60/274 |

FOREIGN PATENT DOCUMENTS

| | | |
|---|---|---|
| CN | 2099367 U | 3/1992 |
| JP | 62-163697 U | 10/1987 |
| JP | 07-246341 A | 9/1995 |
| JP | 2003-024726 A | 1/2003 |
| JP | 2005-270755 A | 10/2005 |
| WO | 2007/023653 A1 | 3/2007 |

OTHER PUBLICATIONS

Chinese Office Action issued in corresponding CN Application No. 201180006511.9, dated Jan. 10, 2014.

* cited by examiner

*Primary Examiner* — Amber Orlando
(74) *Attorney, Agent, or Firm* — Sughrue Mion, PLLC

(57) ABSTRACT

The present invention aims to provide a honeycomb structure capable of preventing a plugging failure and forming cracks by heat shock which are caused by a cell having a small cross-section. The present invention is a honeycomb structure used for a filter for purifying an exhaust gas discharged from an internal combustion engine, wherein the honeycomb structure has a double structure of an outer tube and an inner tube, on the inner side of the inner tube, an inside cell partitioning wall forming an inside through-hole is provided, between the outer tube and inner tube, an outside cell partitioning wall forming an outside through-hole is provided, the inner tube and the inside cell partitioning wall form a through-hole having an irregular cross-section, and connected through-holes are formed by making at least one of the following connection patterns: the connection between a through-hole having an irregular cross-section and an outside through-hole, the through-holes sharing the inner tube, the connection between a through-hole having an irregular cross-section and another through-hole having an irregular cross-section, the through-holes sharing an inside cell partitioning wall, and the connection between a through-hole having an irregular cross-section and an inside through-hole, the through-holes sharing an inside cell partitioning wall.

8 Claims, 2 Drawing Sheets

(A)

(B)

HONEYCOMB STRUCTURE

CROSS REFERENCE TO RELATED APPLICATION

This application is a National Stage of International Application No. PCT/JP2011/050716, filed on Jan. 18, 2011, which claims priorities from Japanese Patent Application No. 2010-008679, filed Jan. 19, 2010, the contents of all of which are incorporated herein by reference in their entirety.

TECHNICAL FIELD

The present invention relates to a honeycomb structure. More specifically, the present invention relates to a honeycomb structure used for a filter for purifying an exhaust gas by collecting microparticles (such as soot) in the exhaust gas discharged from an internal combustion engine such as a diesel engine or a gasoline engine.

BACKGROUND ART

Currently, in a diesel engine which is an internal combustion engine, a ceramics honeycomb structure formed into a tubular shape is commonly used as a filter for collecting soot contained in an exhaust gas (Diesel Particulate Filter: DPF). In such a DPF, a function of collecting soot is given to the honeycomb structure by alternately plugging an opening area of both axial ends in the honeycomb structure (Patent Document 1).

Concretely, as shown in FIG. 2(B), a honeycomb structure 100 made of ceramics is formed to allow transmission of gas through a wall surface 101 that forms the honeycomb, and each thorough-hole 105 (hereinafter, referred to as a "cell") of the honeycomb structure 100 is plugged in its opening area of either axial end with a plugging material 106, and is open in its other end. Focusing on one axial end in the honeycomb structure 100, when one cell 105a is plugged, another cell 105b neighboring this cell 105a is formed into an open state. In other words, when the honeycomb structure 100 is viewed from the axial end side, plugged cells 105a are arranged in a houndstooth pattern (plugged cell is arranged alternately) (see FIG. 2(A)).

Since the honeycomb structure 100 has such a configuration, a DPF functions as will be described later and an exhaust gas is cleaned.

First, an exhaust gas to be cleaned is supplied from one end in the axial direction of a DPF (left end in FIG. 2(B)). Then, the exhaust gas flows into the DPF from the open cell 105b (inflow cell 105b). Since the other end of the inflow cell 105b is plugged, the exhaust gas enters the neighboring cell 105a (outflow cell) through the wall surface 101. Since the outflow cell 105a is open at its other end (outflow side) in the axial direction of the DPF, the exhaust gas flows out from the other end (right end in FIG. 2(B)) in the axial direction of the outflow cell 105a. That is, in the DPF, since the wall surface 101 partitioning the neighboring cells functions as a filter, and harmful substances (for example, microparticles and the like) contained in the exhaust gas can be captured by the wall surface 101, it is possible to clean the exhaust gas.

Incidentally, a honeycomb structure made of ceramics is generally formed by extrusion molding ceramics, and directly firing the molded body. As shown in FIG. 2(A), in a honeycomb structure having a tubular outer shape and having a square cross-section shape of each cell, the cell near its outer circumferential surface is a cell having an irregular shape with smaller cross-section area than other cells (for example, a cell having a trapezoidal or triangular cross-section, hereinafter referred to as a cell having a small cross-section).

When such a cell having a small cross-section exists, plugging may not be appropriately conducted when each cell of the honeycomb structure is plugged. As described above, each cell of the DPF is plugged in its either one of end parts, but there is a possibility that both of ends are not plugged in a cell having a small cross-section. When such a plugging failure arises, the exhaust gas supplied to the DPF and flown into the cell having a small cross-section directly passes through from one end to the other end of the DPF without passing through the wall face. In other words, the exhaust gas is discharged without being cleaned.

Also, the cell having a small cross-section is likely to collapse at the time of extrusion molding or firing, and when the cell having a small cross-section collapses, a streaky recess will be formed on the outer circumferential surface of the honeycomb structure. When a honeycomb structure with such a streaky recess is used as a DPF, the recess is likely to be an origin of a crack caused by heat shock, and there is a high possibility of damage of the honeycomb structure by heat shock.

PRIOR ART DOCUMENT

Patent Document

Patent Document 1: JP-A-2005-270755

SUMMARY OF THE INVENTION

Problems to be Solved by the Invention

In view of the aforementioned circumstances, the present invention aims to provide a honeycomb structure capable of preventing a plugging failure and forming cracks by heat shock which are caused by a cell having a small cross-section.

Solutions to the Problems

A honeycomb structure of the present invention is a honeycomb structure used for a filter for purifying an exhaust gas discharged from an internal combustion engine, wherein the honeycomb structure has a double structure of an outer tube and an inner tube, on the inner side of the inner tube, an inside cell partitioning wall forming an inside through-hole is provided, between the outer tube and inner tube, an outside cell partitioning wall forming an outside through-hole is provided, the inner tube and the inside cell partitioning wall form a through-hole having an irregular cross-section, and connected through-holes are formed by making at least one of the following connection patterns: the connection between a through-hole having an irregular cross-section and an outside through-hole, the through-holes sharing the inner tube, the connection between a through-hole having an irregular cross-section and another through-hole having an irregular cross-section, the through-holes sharing an inside cell partitioning wall, and the connection between a through-hole having an irregular cross-section and an inside through-hole, the through-holes sharing an inside cell partitioning wall.

For the honeycomb structure of the present invention, it is preferable that through-hole having an irregular cross-section having an approximate triangular or an approximate trapezoidal shape viewed in a cross-section of the outer tube is connected.

For the honeycomb structure of the present invention, it is also preferable that a through-hole having an irregular cross-section having an approximate triangular shape viewed in a cross-section of the outer tube is connected with an outside through-hole closest to an apex of the sharpest angle of the through-hole having an irregular cross-section, and a new cell partitioning wall that extends inward in continuation with the outside cell partitioning wall forming the outside through-hole and is parallel with the inside cell partitioning wall is formed, and the shape of the connected through-hole is made to be an approximate pentagon viewed in a cross-section. In this case, it is further preferable that when the new cell partitioning wall forms a new through-hole having an irregular cross-section having an approximate trapezoidal cross-section shape including the cell partitioning wall as an shorter base, the new through-hole having an irregular cross-section is connected with a neighboring through-hole having an irregular cross-section that shares the cell partitioning wall which is a longer base of the new through-hole.

For the honeycomb structure of the present invention, in a cross-section of the outer tube, it is preferable that (i) a through-hole having the smallest open area in all the through-holes has an open area not less than 40% of an average open area of all the through-holes, or (ii) all interior angles of all the through-holes are not less than 30 degrees.

It is also preferable that the outside cell partitioning wall includes an outside circumferential cell partitioning wall which forms the outside through-holes adjoiningly in the circumferential direction of the outer tube, and the outside circumferential cell partitioning wall is formed to be approximately orthogonal to the outer tube. It is also preferable that the outside through-hole is plugged at least one end thereof.

Effects of the Invention

By the present invention, a connected through-hole having a relatively large cross-section area can be formed due to connecting a through-hole having an irregular cross-section with a neighboring outside through-hole, another through-hole having an irregular cross-section, or an inside through-hole. Therefore, even when an inner tube is provided, it is possible to prevent forming a through-hole having a small cross-section area near the inner tube.

Also, when the through-hole having an irregular cross-section that is likely to have a smaller cross-section area than another through-hole having an irregular cross-section (that is, the one having an approximate triangular or approximate trapezoidal shape viewed in a cross-section of an outer tube) is connected with a neighboring outside through-hole, another through-hole having an irregular cross-section, or an inside through-hole to form a through-hole having a relatively large cross-section area, it is possible to prevent forming a thorough-hole having a small cross-section area.

When cross-section areas of all the through-hole in the present invention are made to be equal to or greater than a predetermined size, or when all interior angles of all the through-holes are made to be not less than 30 degrees, even near the part where partitioning walls intersect with each other, a plugging material can be securely charged at the time of plugging the through-hole, and a plugging failure can be prevented.

Further, when an outside circumferential cell partitioning wall is formed to be approximately orthogonal to the outer tube, it is possible to keep the cross-section area of the outside through-hole whose constituent is the outer tube at a certain degree of size. As a result, it is possible to decrease the possibility of collapse of the outside through-hole at the time of molding a honeycomb structure. Therefore, it is possible to keep the outer circumferential surface of the honeycomb structure at a predetermined accuracy. Since it is also possible to decrease the possibility of formation of a streaky recess on the outer circumferential surface of the honeycomb structure, it is possible to decrease the possibility of occurrence of damage on the honeycomb structure by heat shock and the like. Further, when the outside circumferential cell partitioning wall is formed to be approximately orthogonal to the outer tube, even when a force is applied onto the outer circumferential surface of the honeycomb structure, the force can be supported by the outside circumferential cell partitioning wall, and durability to external force of the honeycomb structure can be higher.

In the present invention, by plugging at least one end of the outside through-hole, such a through-hole is expected to have a heat-retaining effect. Also, since the force applied onto the outer tube can be supported by the plugging material, it is possible to increase the strength of the outer tube of the honeycomb structure.

MODE FOR CARRYING OUT THE INVENTION

Figure 1:
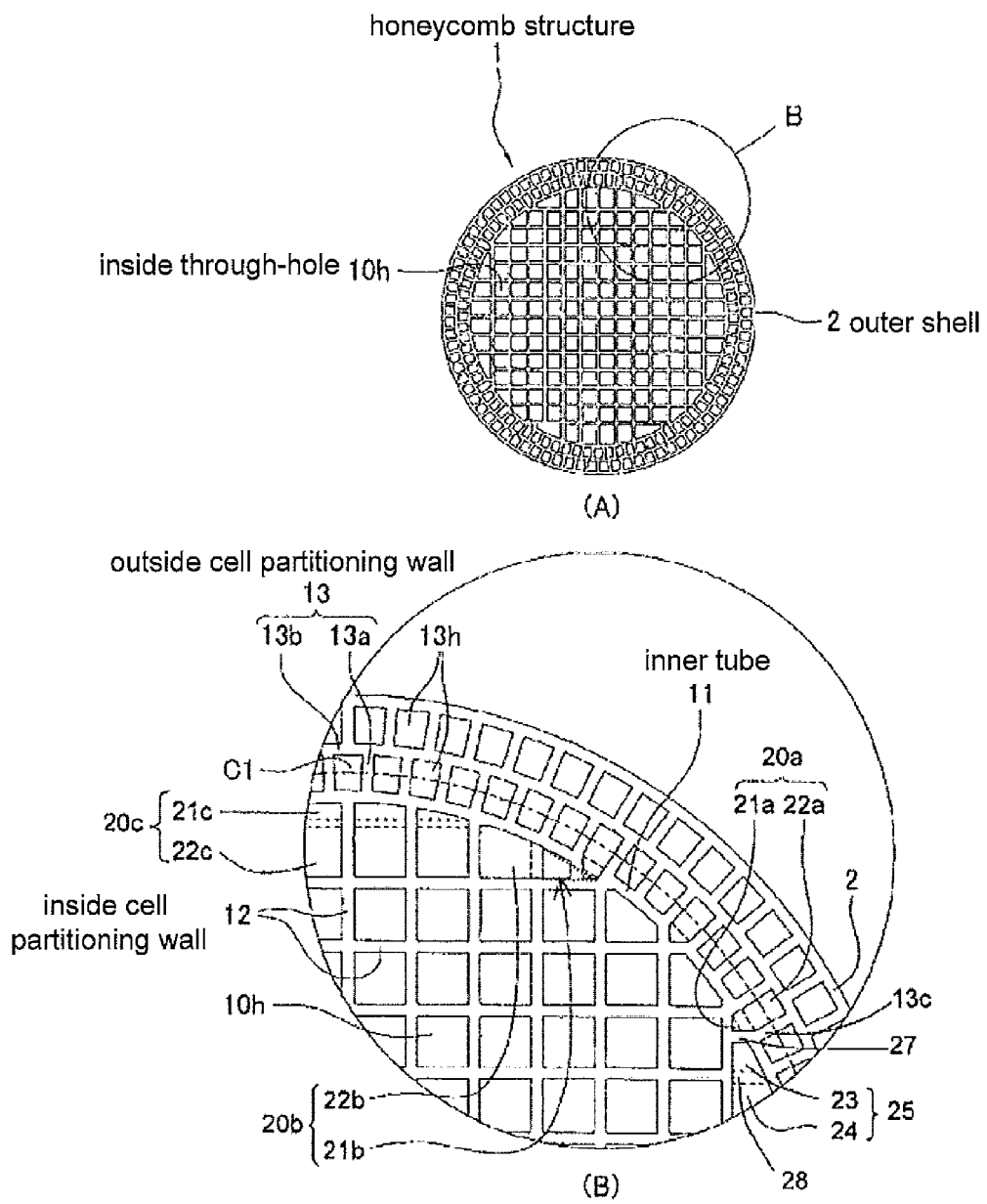
FIGS. 1(A) and 1(B) are schematic illustrative views of a honeycomb structure 1 of the present embodiment, and (A) is a front view and (B) is a partially enlarged view.

Next, an embodiment of the present invention will be described based on the drawings.

A honeycomb structure of the present invention is used for producing an exhaust gas filter for purifying an exhaust gas discharged from an internal combustion engine, and is featured by a structure that will not cause a plugging failure during production of the exhaust gas filter.

The term plugging means closing an open end part of a through-hole (cell) provided in the honeycomb structure with a material of ceramics and the like. The material used for this plugging may or may not have air permeability; however, a material that does not allow passage of microparticles (such as soot) in the exhaust gas is preferably used. In other words, plugging with such a material makes it possible to prevent microparticles such as soot from flowing into a thorough-hole through this plugged end part. As a material used for plugging, for example, a material that does not allow passage of microparticles (such as soot) while having air permeability, as is a material forming walls of the honeycomb structure (outer tube 2, inner tube 11, outside cell partitioning wall 13, inside cell partitioning wall 12 in FIG. 1), may be used. In this case, the material used for plugging may be the same with or different from the material of walls of the honeycomb structure.

Further, an exhaust gas filter produced from the honeycomb structure of the present invention is, for example, a filter (for example, DPF) that captures soot contained in an exhaust gas of a diesel engine or a gasoline engine, and is not particularly limited.

Also, by carrying a catalyst such as platinum in the material of the honeycomb structure of the present invention, it is also possible to produce a catalyst that purifies a harmful substance in the exhaust gas by using the honeycomb structure of the present invention.

(Description of Honeycomb Structure)

First, an outline of a honeycomb structure 1 of the present invention will be described.

In the following, a case where the cross-section of the honeycomb structure 1 is circular, namely a case where the honeycomb structure 1 is cylindrical will be described; however, the honeycomb structure 1 of the present invention is not particularly limited to the cylinder and may have a cross-section of an approximate triangular shape (triangular shape with rounded apexes, a so-called triangular riceball shape), an elliptical shape, or a shape combining a straight line and a semicircle like a track for athletics and the like, and the shape of the honeycomb structure 1 is not particularly limited.

In the following, a case where a basic shape of cross-section of a through-hole (cross-section orthogonal to the axial direction of the honeycomb structure), namely a basic shape of opening cross-section of a through-hole is quadrate (square or rectangle) will be described. However, the shape of opening cross-section of a through-hole in the honeycomb structure of the present invention is not limited to a precise quadrate, and may be an approximate quadrate, or may be a pentagon, a hexagon, an octagon, a circle and the like, and is not particularly limited.

Further, in the following, the honeycomb structure formed so that neighboring through-holes have an almost equivalent cross-section area of open cross-section, namely a honeycomb structure of so-called symmetric cells is described. However, the honeycomb structure of the present invention exerts similar action and effect even when the honeycomb structure is formed so that neighboring through-holes have different cross-section areas of open cross-section, namely the honeycomb structure has asymmetric cells.

As shown in FIG. 1(A), the honeycomb structure 1 of the present invention is a tubular (cylindrical in the illustrated example) structure extending along the axial direction (the direction orthogonal to the sheet plane in FIG. 1), and has a plurality of through-holes (10h, 13h, 20a, 20b, 20c, 25 and the like) penetrating between both axial ends along the axial direction.

The honeycomb structure 1 of the present invention is formed of ceramics that is fired after extrusion molding of a green body comprising a starting material powder, a molding aid, water and a optionally-added pore-forming agent, and wall surfaces forming the plurality of through-holes 10h and 13h and the like (inside cell partitioning wall 12, outside cell partitioning wall 13, outer tube 2, inner tube 11 and the like) are porous surfaces having pores with an average micropore size not more than 20 μm. The ceramics that forms the honeycomb structure of the present invention is not particularly limited, and examples thereof include aluminum titanate-based ceramics such as aluminum titanate, magnesium titanate and aluminum magnesium titanate.

As shown in FIG. 1, the honeycomb structure 1 has a tubular (cylindrical in the illustrated example) outer tube (outer shell) 2, and has a plurality of partitioning walls on the inner side, and the plurality of through-holes 10h, 13h and the like are formed by the outer tube 2 and the plurality of partitioning walls, and the part having through-holes formed by these partitioning walls is also referred to as a cell part. More specifically, the honeycomb structure 1 has a double structure of the outer tube 2 and the inner tube (inner partitioning wall) 11 located on the inner side of the outer tube 2, and a first cell partitioning wall (outside cell partitioning wall) 13 is provided between the outer tube 2 and the inner tube 11, and a second cell partitioning wall (inside cell partitioning wall) 12 is formed on the inner side of the inner tube 11. Then, the outside through-hole 13h is formed by the outside cell partitioning wall 13 and the outer tube 2, or by the outside cell partitioning wall 13 and the inner tube 11, and the inside through-hole 10h is formed by inside cell partitioning walls 12.

The inner tube 11 is a tubular (cylindrical in the illustrated example) wall provided on the inner side of the inner surface of the outer tube 2 as described above. The inner tube 11 is formed so that the central axis thereof is coaxial to the outer tube 2, and the shape of cross-section that is orthogonal to the axial direction of the outer tube 2 (hereinafter, simply referred to as a cross-section) is similar in shape to the outer tube 2.

On the inner side of the inner tube 11, a plurality of inside cell partitioning walls 12 that partition the interior space of the inner tube 11 are provided. Each of the plurality of inside cell partitioning walls 12 is formed so that its surface is parallel with the axial direction of the outer tube 2, and disposed so that the inside cell partitioning walls 12 that intersect with each other intersect at right angles. In other words, the space surrounded by the plurality of inside cell partitioning walls 12 forms the through-hole (hereinafter, referred to as an inside through-hole) 10h, and the plurality of inside cell partitioning walls 12 are disposed so that the shape of the cross-section of the inside through-hole 10h is quadrate, and the axial direction of the inside through-hole 10h is parallel with the axial direction of the outer tube 2.

Also, between the inner tube 11 and the outer tube 2, a plurality of outside cell partitioning walls 13 forming the through-hole (hereinafter, referred to as an outside through-hole) 13h are provided. Each of the plurality of outside cell partitioning walls 13 is formed so that its surface is parallel with the axial direction of the outer tube 2.

This outside cell partitioning wall 13 has an outside circumferential cell partitioning wall (outer circumferential partitioning wall) 13a which forms the outside through-holes 13h adjoiningly in the circumferential direction of the outer tube 2. The outside circumferential cell partitioning wall 13a partitions the space between the outer tube 2 and the inner tube 11, and forms the outside through-holes 13h while they are adjoined in the direction along the inner surface of the outer tube 2. The outside circumferential cell partitioning wall 13a is formed to be approximately orthogonal to the inner surface of the outer tube 2. In other words, at the position where a circle C1 that shares the center with the outer tube 2 intersects with the outside cell partitioning wall 13 in the cross-section, tangent line of the circle C1 at that position and the outside cell partitioning wall 13 are orthogonal to each other.

The outside circumferential cell partitioning wall may not be approximately orthogonal to the outer tube, and may be formed so that the shape of the cross-section of the outside through-holes neighboring in the circumferential direction of the outer tube are approximately trapezoidal.

Figure 2:
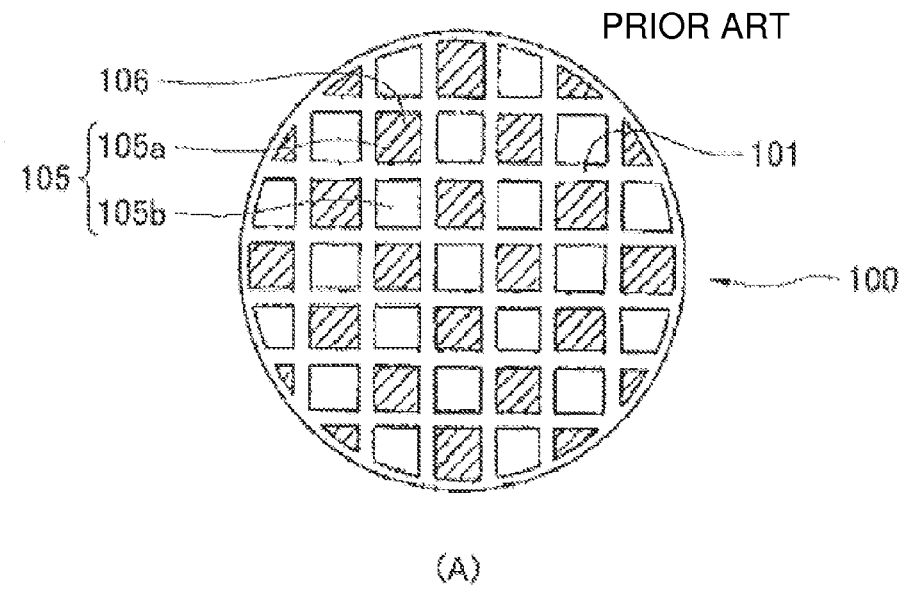
FIGS. 2(A) and 2(B) are schematic illustrative views of a honeycomb structure 100 of a conventional example, and (A) is a front view and (B) is a section view.
Figure 2:
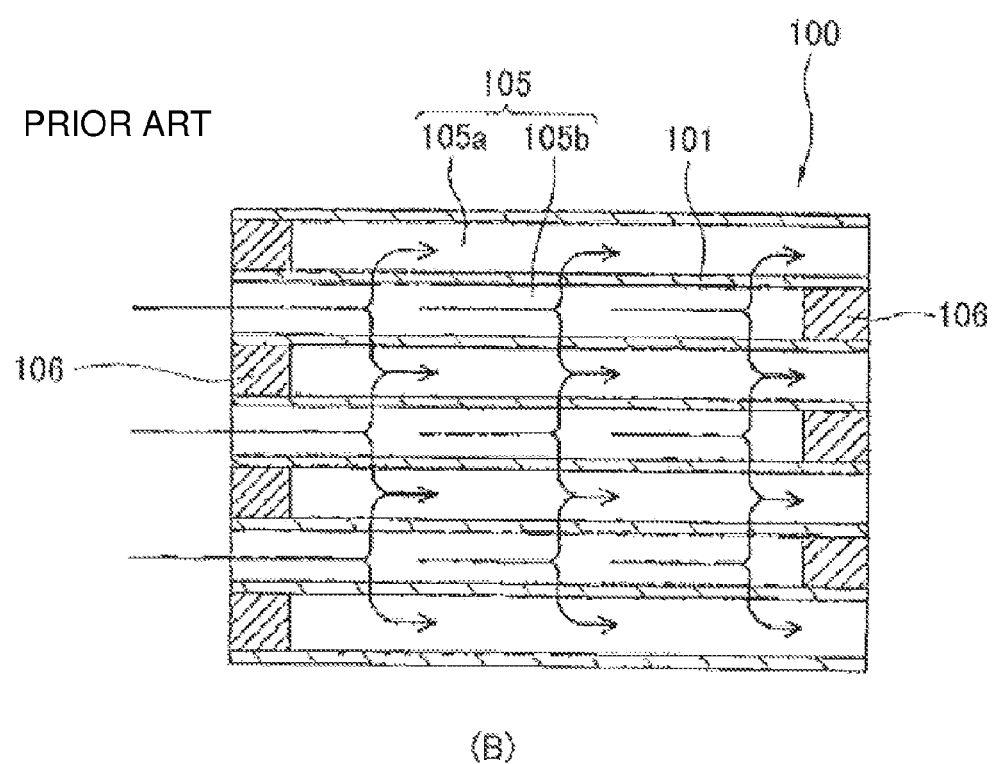

In the honeycomb structure 1 of the present invention, by plugging either one of end parts for all of the inside through-holes 10h and all of the outside through-holes 13h, it is possible to make the honeycomb structure 1 into an exhaust gas filter (see FIG. 2).

When gas to be purified such as an exhaust gas is supplied from one end side of the honeycomb structure 1 after plugging, the gas cannot flow out on the side of the other end of the honeycomb structure 1 unless it essentially passes through either one of partitioning walls, so that it is possible to collect microparticles such as soot by the partitioning wall and to purify the exhaust gas.

In the honeycomb structure 1 of the present invention, the inner tube 11 is provided, and the outside cell partitioning wall 13 is provided between the inner tube 11 and the outer tube 2. In this manner, it is possible to make the outside through-hole 13$h$ formed between the outer tube 2 and the inner tube 11 have a shape independent of the inside through-hole 10$h$ in the inner tube 11, so that it is possible to keep the cross-section area of the outside through-hole 13$h$ whose constituent is the outer tube 2 at a certain degree of size.

Therefore, it is possible to lower the possibility that the outside through-hole 13$h$ whose constituent is the outer tube 2 collapses when the honeycomb structure 1 is formed by extrusion molding and the like, and thus it is possible to keep the outer circumferential surface of the honeycomb structure 1 at a predetermined accuracy.

Since the outside through-hole 13$h$ whose constituent is the outer tube 2 does not collapse, the possibility that a streaky recess is formed on the outer circumferential surface of the honeycomb structure 1 can also be decreased. As a result, it is possible to decrease the possibility that the honeycomb structure 1 is damaged by heat shock and the like caused by the streaky recess.

Further, since the outside cell partitioning wall 13 has the outside circumferential cell partitioning wall 13$a$ formed to be approximately orthogonal to the inner surface of the outer tube 2, even when such a force that compresses the outer tube 2 inward is applied onto the outer circumferential surface of the outer tube 2, the force can be supported by the outside circumferential cell partitioning wall 13$a$. Therefore, it is possible to increase the durability of the honeycomb structure 1 to the external force, and to decrease the possibility that the honeycomb structure 1 is damaged by the external force.

In the case of the outside through-hole 13$h$ whose constituent is the outer tube 2, it is also possible to make the plugged material in the plugged part support the force applied onto the honeycomb structure 1, so that it is possible to increase the strength of the outer tube 2, and to prevent damage on the honeycomb structure 1.

Concretely, when the honeycomb structure 1 of the present invention is used as an exhaust gas filter for purifying an exhaust gas discharged from an internal combustion engine, the honeycomb structure 1 is housed in a metal case while it is wrapped with a heat-retaining material and the like. At this time, there is a case where an end edge of the outer tube 2 of the honeycomb structure 1 comes into contact with the case, and due to this contact, the outer tube 2 may be recessed or chipped and the outside through-hole 13$h$ may be damaged. However, when the outside through-hole 13$h$ whose constituent is the outer tube 2 is plugged, even if such a contact occurs, damage on the outer tube 2, namely, damage on the outside through-hole 13$h$ can be prevented.

Further, by plugging both ends of the outside through-hole 13$h$ formed between the outer tube 2 and the inner tube 11, it is possible to form a gas layer within the outside through-hole 13$h$. As a result, it is possible to make the outside through-hole 13$h$ function as a heat-retaining layer for keeping the heat in the region on the inner side of the inner tube 11 inside the inner tube 11.

For example, when the honeycomb structure 1 is used as a DPF, the following effects can be obtained by providing the heat-retaining layer.

In a DPF, microparticles such as soot captured by the partitioning wall forming the through-hole is heated to be oxidatively combusted, for example, by an exhaust gas, so that the partitioning wall is self-regenerated. For effectively conducting such self-regeneration, it is preferred that the temperature of the DPF in the cross-section of the region of capturing soot and the like is kept uniform.

However, since heat radiation to the outside air is large near the outer tube 2 of the DPF, when soot and the like is captured in this part, the soot and the like cannot be sufficiently combusted and self-regeneration of the partition wall cannot be achieved. This will lead occurrence of clogging and the like in the DPF, and functional deterioration of the DPF may be caused.

In light of this, the soot and the like is not captured near the outer tube 2 where the temperature is likely to decrease and the neighborhood of the outer tube 2 is made to function as a heat-retaining layer by providing the outside through-hole 13$h$ plugged at both ends as described above, and the region for capturing soot and the like (indicating inside through-hole 10$h$ and the like, hereinafter referred to as a filter region) can be surrounded by the outside through-hole 13$h$ as a heat-retaining layer, so that it is possible to prevent heat generated by combustion of soot and the like in the filter region from escaping. Therefore, since the temperature in the cross-section can be uniformized in the filter region, it is possible to effectively achieve self-regeneration of the DPF and to prevent functional deterioration of the DPF due to clogging and the like.

When the outside through-hole 13$h$ formed between the outer tube 2 and the inner tube 11 is made to be a heat-retaining layer, both ends are not necessarily plugged. For example, it is possible to make the outside through-hole 13$h$ to be a heat-retaining layer only by plugging the end part of the outside through-hole 13$h$ on the inflow side of an exhaust gas. This is because when the end part on the inflow side of an exhaust gas is plugged, soot will not flow into the outside through-hole 13$h$ and combustion of the soot will not occur in the outside through-hole 13$h$, so that it is possible to make the outside through-hole 13$h$ function merely as an air layer.

Between the outer tube 2 and the inner tube 11, a plurality of outside through-holes 13$h$ may be arranged along the radial direction of the honeycomb structure 1. That is, a plurality of heat-retaining layers may be provided in the radial direction of the honeycomb structure 1 between the outer tube 2 and the inner tube 11, and in this case, the heat-retaining effect can be further improved.

For example, between the outer tube 2 and the inner tube 11, an intermediate tube (also referred to as a cell partitioning wall in the outside radial direction) 13$b$ having the same central axis with these tubes may be provided as shown in FIG. 1. This intermediate tube (cell partitioning wall in the outside radial direction) 13$b$ preferably has a cross-section shape similar to that of the outer tube 2. By providing the outside circumferential cell partitioning wall 13$a$ between the outer tube 2 and the intermediate tube 13$b$ and between the intermediate tube 13$b$ and the inner tube 11, respectively, it is possible to provide a plurality of heat-retaining layers in the radial direction and in the circumferential direction.

Next, a characteristic cell structure in the honeycomb structure 1 of the present invention will be described.

That is, when through-holes (boundary part, also referred to as a cell having a small cross-section) 21$a$, 21$b$, 21$c$ having cross-sections of irregular shapes (preferably approximate triangular shape or approximate trapezoidal shape) are formed by the inner tube 11 and the inside cell partitioning wall 12, on the inner side of (near) the inner tube 11, a plugging failure may occur in the through-holes having an irregular cross-section 21$a$, 21$b$, 21$c$ because their hole diameters are small. In light of this, these through-holes having an irregular cross-section 21$a$, 21$b$, 21$c$ may be connected with another through-hole (namely, outside through-hole 22$a$) that shares the inner tube 11 with the through-hole having an irregular cross-section 21$a$ to form a first connected through-hole 20$a$, or the through-holes having an irregular cross-section 21$b$, 21$c$ may be connected with another through-hole (namely, other through-hole having an irregular cross-section 22b, inside through-hole 22c and the like) that respectively shares the inside cell partitioning wall 12 to form second and third connected through-holes 20b, 20c. By connecting the through-holes having an irregular cross-section (cell having a small cross-section) 21a, 21b, 21c to neighboring through-holes (neighboring cell, also referred to as connecting part) 22a, 22b, 22c in this manner, it is possible to enlarge the opening sizes (cross-section areas) of the through-holes, and to prevent plugging failures of the through-holes 20a, 20b, 20c. While the plugging failure can be reduced in comparison with the conventional case by forming at least either one of these first, second and third connected through-holes 20a, 20b, 20c, it is recommended to form preferably two or more (particularly all) of these connected through-holes.

More preferably, the first connected through-hole 20a is formed in the following manner. The through-hole having an irregular cross-section 21a surrounded by the inner tube 11 and the inside cell partitioning wall 12, which has an approximate triangular cross-section shape, is connected with the outside through-hole 22a closest to the apex of the sharpest angle of the through-hole having an irregular cross-section 21a. In a preferred example, a new inside cell partitioning wall 27 that extends inward in continuation with the outside cell partitioning wall 13c forming the outside through-hole 22a and is parallel with the inside cell partitioning wall 12 is formed, and the connected through-hole 20a having an approximate pentagonal cross-section shape is formed. By such connection, it is possible to make the angle of the sharpest apex of the through-hole having an irregular cross-section 21 larger, and to prevent a plugging failure more securely. When the inside cell partitioning wall 12 is contained inside the connected through-hole 20a in forming the connected through-hole 20a having an approximate pentagonal cross-section shape, the inside cell partitioning wall located inside the connected through-hole 20a may be removed.

Also in a preferred example, when the new cell partitioning wall 27 as described above forms a new through-hole having an irregular cross-section 23 having an approximate trapezoidal cross-section shape including the cell partitioning wall 27 as an shorter base, the new through-hole having an irregular cross-section 23 may be connected with a neighboring through-hole having an irregular cross-section 24 that shares a cell partitioning wall 28 which is a longer base of the new through-hole 23, to form a connected through-hole 25.

The connected through-holes 20a, 20b, 20c, 25 formed in the manner as described above are through-holes having a new irregular cross-section surrounded by the inner tube 11 and the inside cell partitioning wall 12 (that may include the new inside cell partitioning wall 27).

As described above, by connecting the through-holes having an irregular cross-section 21a, 21b, 21c having a relatively small cross-section area of opening in the cross-section (hereinafter, simply referred to as an open area), it is possible to form the connected through-holes 20a, 20b, 20c, 25 having a relatively large cross-section area. In other words, since a through-hole having a relatively large open area can be formed in the position where a through-hole having a relatively small open area is supposed to be formed by providing the inner tube 11, it is possible to prevent a through-hole that is likely to cause a plugging failure from being formed near the inner tube 11.

Preferably, by providing the connected through-holes 20a, 20b, 20c, 25, the through-holes having the smallest open area have an open area not less than 40% of an average open area of all of the through-holes 10h, 13h, 20a, 20b, 20c, 25 (hereinafter, simply referred to as all through-holes) in the cross-section.

In this case, since all through-holes including the connected through-holes 20a, 20b, 20c, 25 have an open area of equal to or larger than a predetermined size, occurrence of a plugging failure can be prevented.

For example, a honeycomb structure used in a DPF has about 200 to 400, and preferably about 250 to 350 through-holes in a region of 1 inch×1 inch, and by making open area of each of all through-hole not less than 40% (about 0.4 to 0.64 mm$^2$) of the average open area (about 1.0 to 1.6 mm$^2$), it is possible to produce a DPF not causing a plugging failure.

Further, in all the through-holes, it is more preferred that the internal angle made by partitioning walls that form the through-hole and intersect with each other is not less than 30 degrees.

In this case, in plugging the through-holes 10h, 13h, 20a, 20b, 20c, 25, it is possible to securely charge the plugging material even near the part where the partitioning walls intersect with each other (corner part). As a result, it is possible to prevent a plugging failure from occurring when the honeycomb structure 1 is plugged for making it into a filter for purifying an exhaust gas discharged from an internal combustion engine.

In the above example, description has been made for a case where the inner tube 11 is single; however, the inner tube 11 may be provided double or more. Also in this case, by forming the connected through-holes 20a, 20b, 20c, 25 as described above, it is possible to prevent a through-hole having a small open area from being formed, and to prevent occurrence of a plugging failure.

Further, in the above example, description has been made for a case where the inner tube 11 is similar in shape to the outer tube 2; however, the inner tube 11 is not necessarily similar in shape to the outer tube 2. For example, the outer tube 2 may be in the shape of an ellipse or a riceball, or a track for athletics, and the inner tube 11 may be circular.

INDUSTRIAL APPLICABILITY

The honeycomb structure of the present invention is suitable for purifying an exhaust gas discharged from an internal combustion engine such as a diesel engine or a gasoline engine.

DESCRIPTION OF REFERENCE SIGNS 1 honeycomb structure
2 outer tube
10h inside through-hole
11 inner tube
12 inside cell partitioning wall
13 outside cell partitioning wall
13a outside circumferential cell partitioning wall
13h outside through-hole
20a, 20b, 20c connected through-hole
21a, 21b, 21c through-hole having an irregular cross-section

The invention claimed is:
1. A honeycomb structure used for a filter for purifying an exhaust gas discharged from an internal combustion engine, wherein
the honeycomb structure has a double structure of an outer tube and an inner tube,
on the inner side of the inner tube, an inside cell partitioning wall forming an inside through-hole is provided, between the outer tube and inner tube, an outside cell partitioning wall forming an outside through-hole is provided, the inner tube and the inside cell partitioning wall form a through-hole having an irregular cross-section, and connected through-holes are formed by making at least one of the following connection patterns: the connection for forming a single hole between a through-hole having an irregular cross-section and an outside through-hole, the through-holes sharing the inner tube, the connection for forming a single hole between a through-hole having an irregular cross-section and another through-hole having an irregular cross-section, the through-holes sharing an inside cell partitioning wall, and the connection for forming a single hole between a through-hole having an irregular cross-section and an inside through-hole, the through-holes sharing an inside cell partitioning wall.

2. The honeycomb structure according to claim 1, wherein a through-hole having an irregular cross-section having an approximate triangular or an approximate trapezoidal shape viewed in a cross-section of the outer tube is connected.

3. The honeycomb structure according to claim 1, wherein a through-hole having an irregular cross-section having an approximate triangular shape viewed in a cross-section of the outer tube is connected with an outside through-hole closest to an apex of the sharpest angle of the through-hole having an irregular cross-section, and a new cell partitioning wall that extends inward in continuation with the outside cell partitioning wall forming the outside through-hole and is parallel with the inside cell partitioning wall is formed, and the shape of the connected through-hole is made to be an approximate pentagon viewed in a cross-section.

4. The honeycomb structure according to claim 3, wherein when the new cell partitioning wall forms a new through-hole having an irregular cross-section having an approximate trapezoidal cross-section shape including the cell partitioning wall as an shorter base, the new through-hole having an irregular cross-section is connected with a neighboring through-hole having an irregular cross-section that shares the cell partitioning wall which is a longer base of the new through-hole.

5. The honeycomb structure according to claim 1, wherein in a cross-section of the outer tube, a through-hole having the smallest open area in all the through-holes has an open area not less than 40% of an average open area of all the through-holes.

6. The honeycomb structure according to claim 1, wherein in a cross-section of the outer tube, all interior angles of all the through-holes are not less than 30 degrees.

7. The honeycomb structure according claim 1, wherein the outside cell partitioning wall includes an outside circumferential cell partitioning wall which forms the outside through-holes adjoiningly in the circumferential direction of the outer tube, and the outside circumferential cell partitioning wall is formed to be approximately orthogonal to the outer tube.

8. The honeycomb structure according claim 1, wherein the outside through-hole is plugged at least one end thereof.

* * * * *